US007046505B2

(12) United States Patent
Hsu

(10) Patent No.: US 7,046,505 B2
(45) Date of Patent: May 16, 2006

(54) FIXING MECHANISM OF AN ELECTRONIC DEVICE

(75) Inventor: Hsin-An Hsu, Taipei (TW)

(73) Assignee: First International Computer, Inc., Taipei (TW)

( * ) Notice: Subject to any disclaimer, the term of this patent is extended or adjusted under 35 U.S.C. 154(b) by 284 days.

(21) Appl. No.: 10/779,655

(22) Filed: Feb. 18, 2004

(65) Prior Publication Data

US 2005/0180097 A1 Aug. 18, 2005

(51) Int. Cl.
*H05K 5/00* (2006.01)
(52) U.S. Cl. ...................................... 361/679; 361/686
(58) Field of Classification Search ................ 361/679, 361/683, 685, 686
See application file for complete search history.

(56) References Cited

U.S. PATENT DOCUMENTS 4,941,841 A * 7/1990 Darden et al. .............. 361/685
5,121,296 A * 6/1992 Hsu ........................... 361/685
5,442,513 A * 8/1995 Lo .............................. 361/685
2002/0145847 A1* 10/2002 Crosby ....................... 361/683

* cited by examiner

*Primary Examiner*—Yean-Hsi Chang
(74) *Attorney, Agent, or Firm*—Bacon & Thomas, PLLC

(57) ABSTRACT

A fixing mechanism of an electronic device comprising a frame with an inverted "L" shape sliding slot on one side, a wall with a sliding track on one side is on the edge of the other side, a pair of open slots are on the sliding track, a stopper can move freely is on the open slots, an inverted "L" shape standing stopper is on one side of the wall facing the stopper, a handle is on the back of the standing stopper, a protruding bar is on the handle, an opening corresponding to the protruding bar is on the wall; when the stopper moves forward, the protruding bar wedges into the opening and fixes the stopper from moving. When an electronic device is installed on the frame, the electronic device is locked firmly onto the frame by the standing stopper pressing on both sides and can be moved out of the frame easily and rapidly.

3 Claims, 7 Drawing Sheets

FIXING MECHANISM OF AN ELECTRONIC DEVICE

BACKGROUND OF THE INVENTION

I. Field of the Invention

This invention relates generally to a fixing mechanism of an electronic device and, more specifically, to a fixing mechanism of an electronic device that offers a simpler and faster method to take the electronic device out of a computer when the electronic device malfunctions.

II. Description of the Prior Art

Heretofore, it is known that a fixing mechanisms of a DVD drive, referring to FIG. 1, is to have a frame 10 of a DVD drive 2 installed onto a cavity of a computer; a plurality of through holes 13 are on the wall 11 of the frame 10, one screw 15 is on each through hole 13, same number of screw holes 16 corresponding to the through holes are on the DVD drive 2; when the DVD drive 2 is installed onto the frame 10, each screw 15 passes through the through hole 13 of the frame 10 and is fixed to the corresponding screw hole 16 on the DVD drive 2 to fix the DVD drive 2 on the cavity of the computer.

The DVD drive 2 is fixed on the computer and not easy to take apart; if the DVD drive 2 malfunctions and to be repaired, users have to dismantle the computer to take the DVD drive 2 from the computer, and then take the DVD drive 2 out from the frame 10 to repair, such structure is very inconvenient.

SUMMARY OF THE INVENTION

It is therefore a primary object of the invention to provide a fixing mechanism of an electronic device that offers a simpler and faster method to take the electronic device out of a computer when the electronic device mal functions.

In order to achieve the objective set forth, a fixing mechanism of an electronic device in accordance with the present invention comprises a frame with an inverted "L" shape sliding slot on one side, a wall with a sliding track on one side is on the edge of the other side, a pair of open slots are on the sliding track, a stopper can move freely is on the open slots, an inverted "L" shape standing stopper is on one side of the wall facing the stopper, a handle is on the back of the standing stopper, a protruding bar is on the handle, an opening corresponding to the protruding bar is on the wall; when the stopper moves forward, the protruding bar wedges into the opening and fixes the stopper from moving. When the electronic device is installed on the frame, the electronic device is locked firmly onto the frame by the standing stopper pressing on both sides; users can pull the handle to have the protruding bar moved away from the opening, and pull the stopper backward to have the electronic device moved away from the pressure of the standing stopper to take the electronic device out from the frame.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
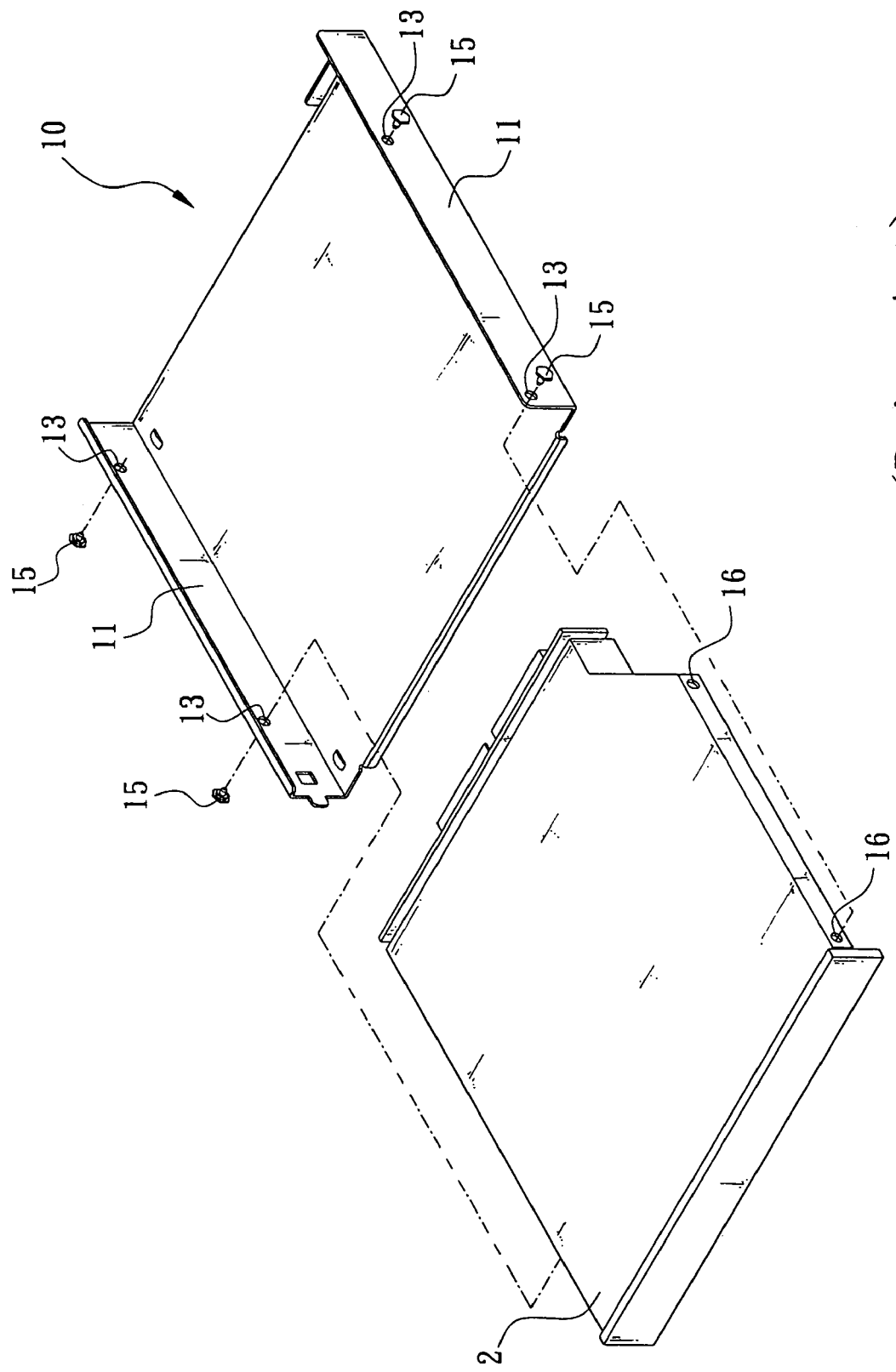
FIG. 1 is a perspective view of the prior art.
Figure 2:
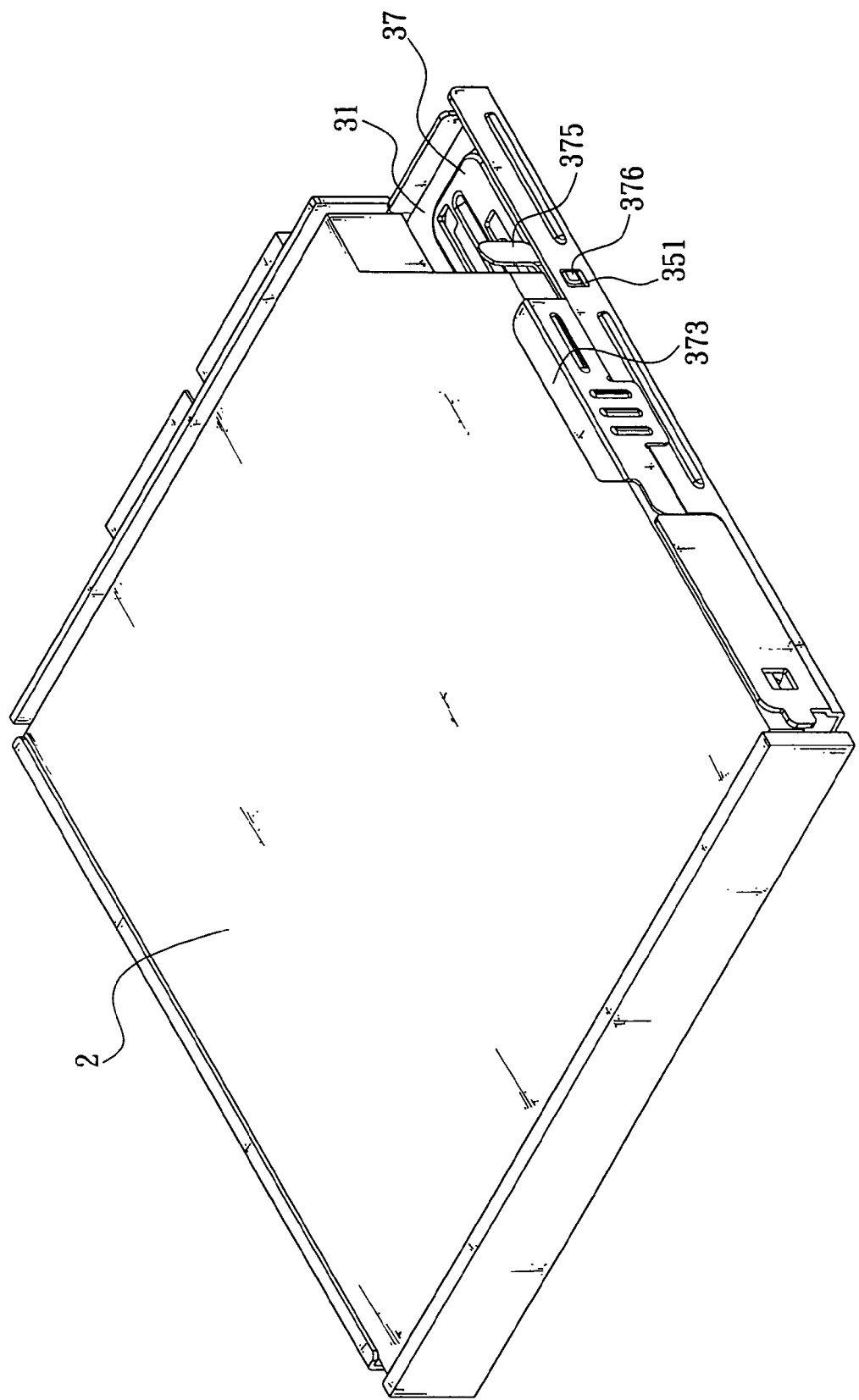
FIG. 2 is a perspective view of electronic device the present invention.
Figure 3:
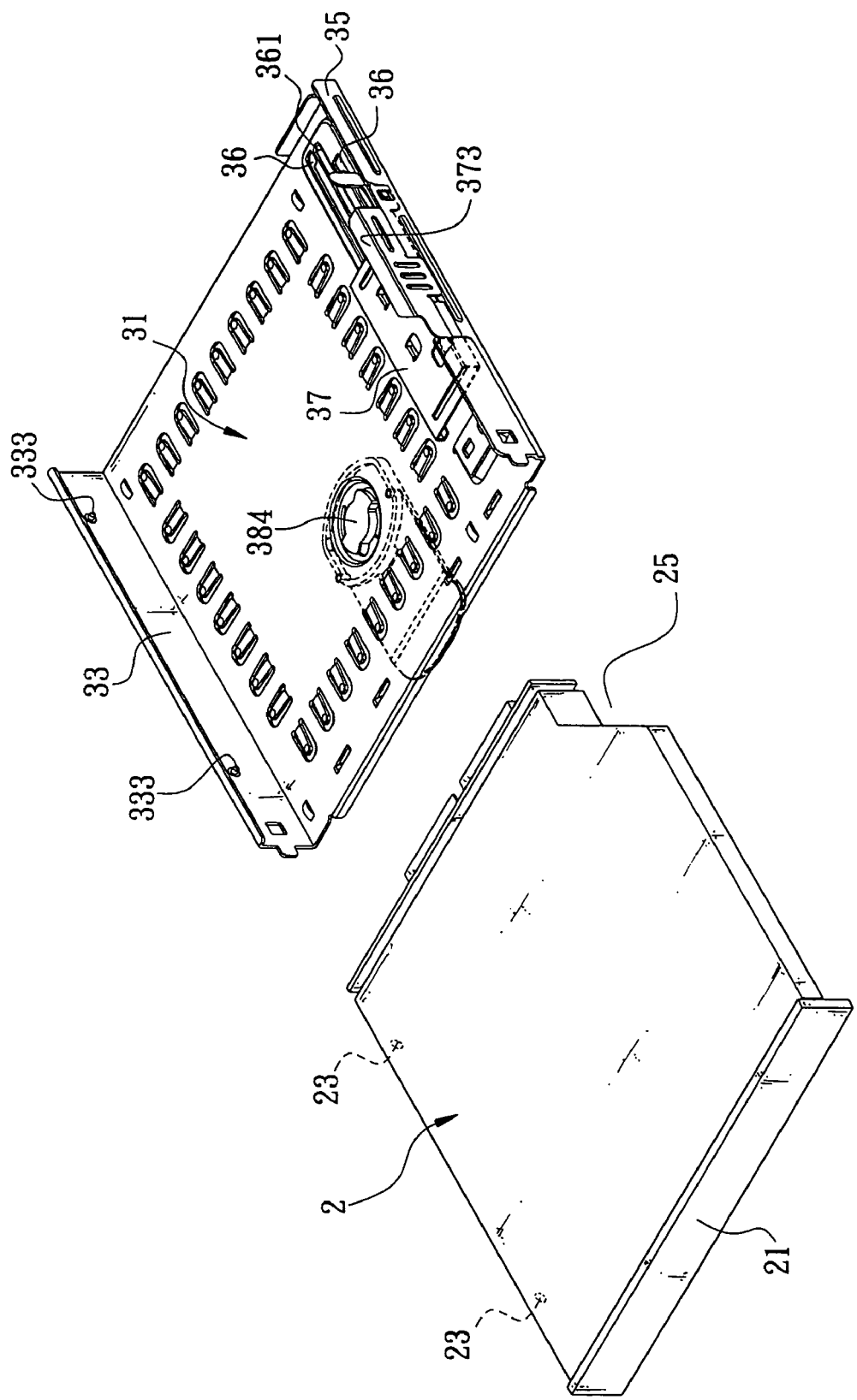
FIG. 3 is an assembly view of a frame and an electronic device according to the present invention.
Figure 4:
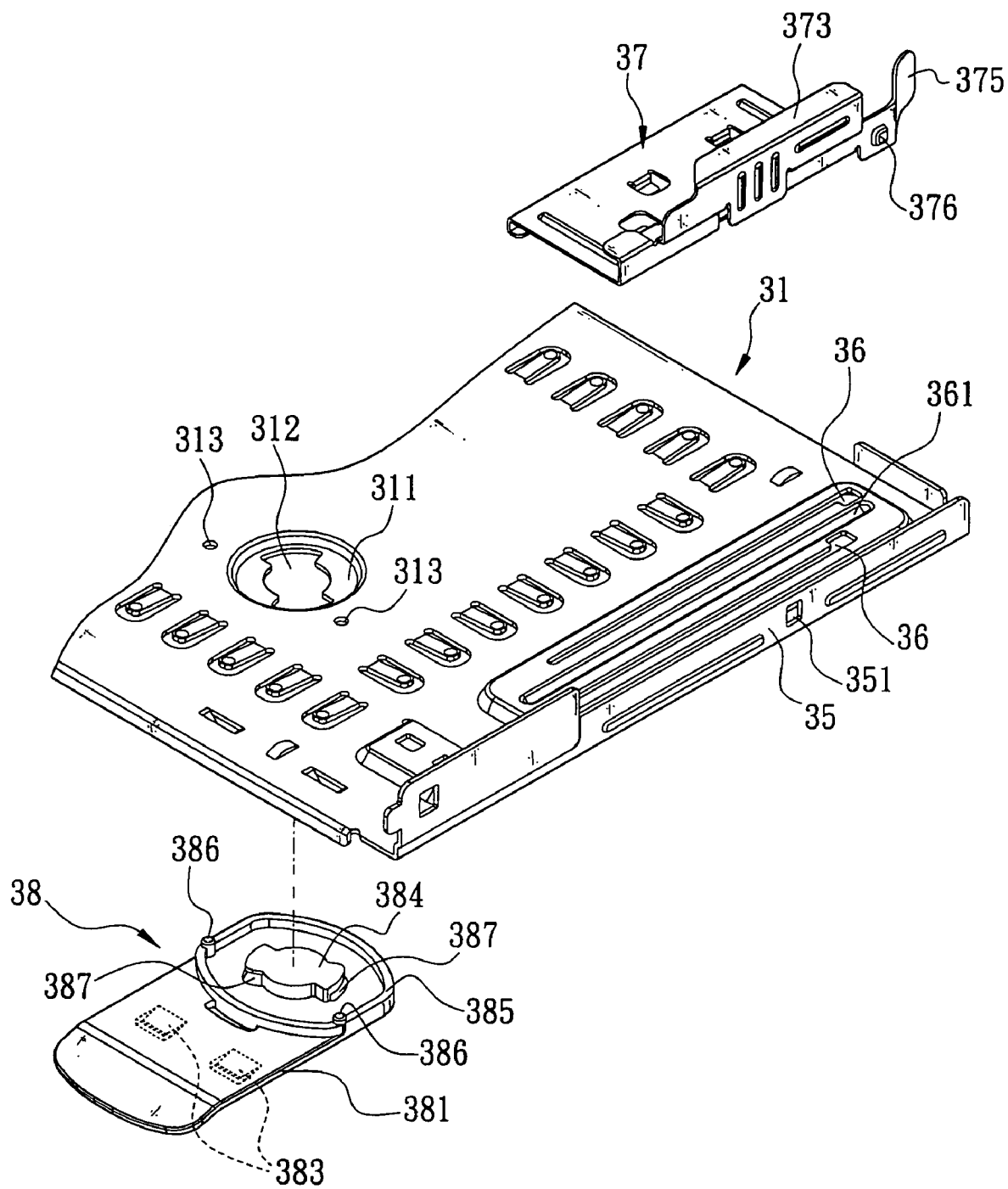
FIG. 4 is an assembly view of the frame, a stopper and a fastening part according to the present invention.
Figure 5:
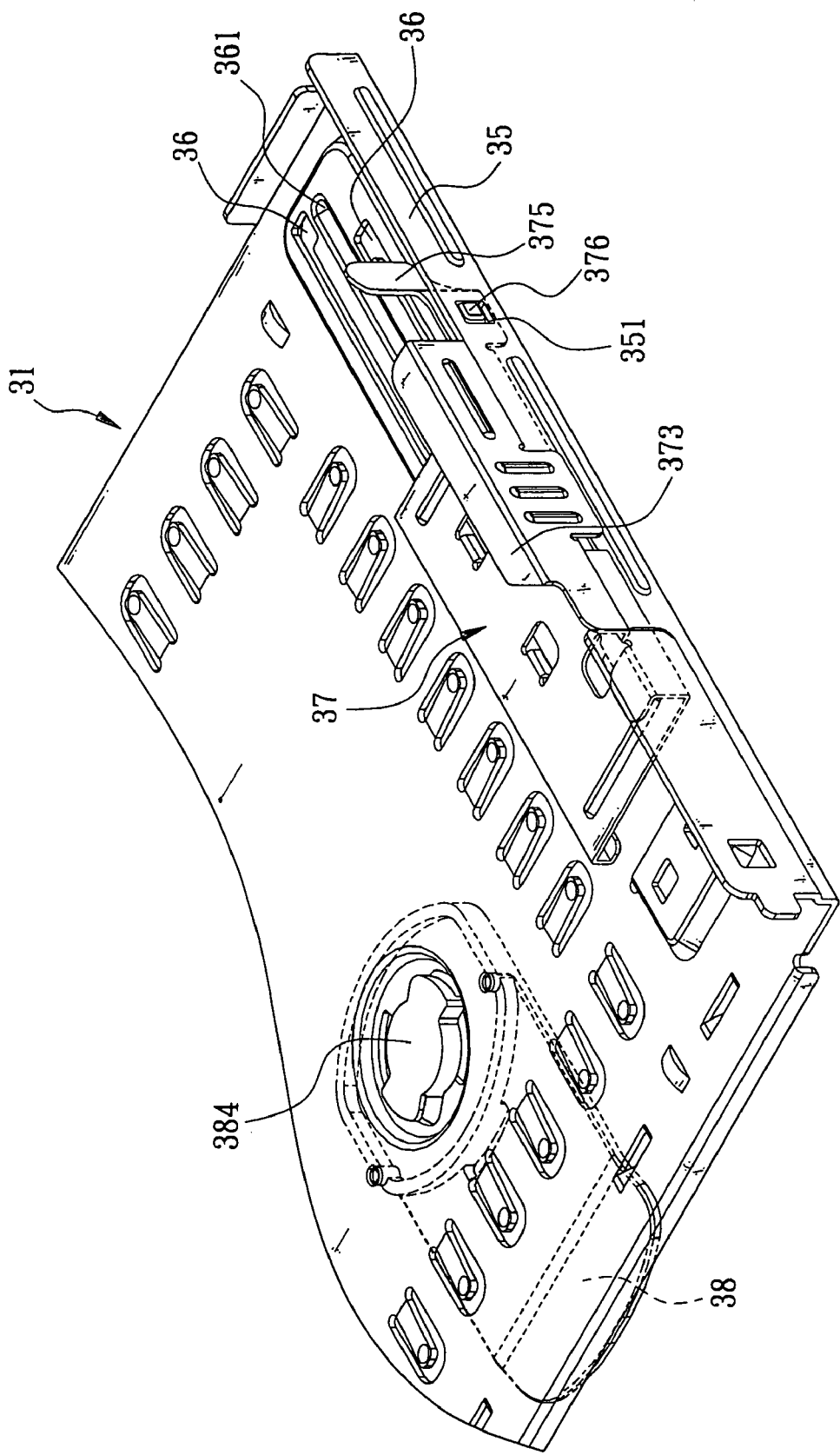
FIG. 5 is an enlarged perspective view of the present invention after the stopper and fastening part being assembled to the frame.
Figure 6:
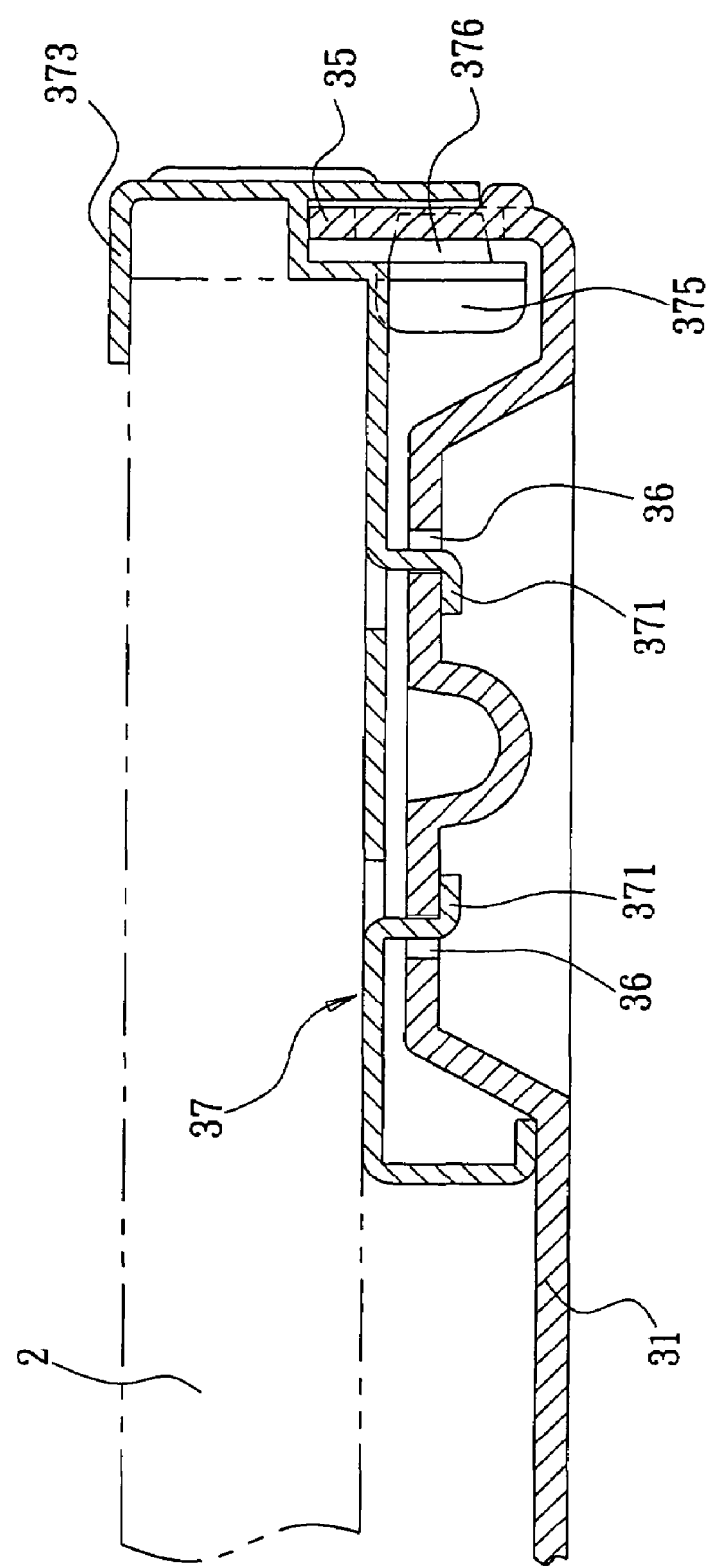
FIG. 6 is a cross-sectional view of the present invention.

Referring to FIG. 2 and FIG. 3, the present invention is installed inside a cavity (not shown in FIG) of a computer and is composed of a frame 31, an inverted "L" shape sliding slot 33 is on one side of the frame 31, a wall 35 is on the edge of the other side thereof, referring to FIG. 3, FIG. 4 and FIG. 5, a sliding track is on the wall 35 closes to the frame 31; a pair of open slots 36 are on the sliding track, the pair of open slots 36 are parallel to each other, a rib 361 is between the open slots 36; a stopper 37 can move freely is on the open slot 36, a pair of hooks 371 (as shown in FIG. 6) are on the bottom of the stopper 37 to hook on the corresponding open slots 36 and make the stopper 37 move back and forward on the open slots 36; an inverted "L" shape standing stopper 373 is on one side of the wall 35 facing the stopper 37, a handle 375 is on the back of the standing stopper 373, a protruding bar 376 is on the handle 375, an opening 351 corresponding to the protruding bar 376 is on the wall 35, when the stopper 37 moves forward, the protruding bar 376 wedges into the opening 351 and fixes the stopper 37 from moving.

Based on the structure describe above and referring to FIG. 3, FIG. 4 and FIG. 5, when an electronic device 2 is installed on the frame 31, users can pull the stopper 37 backward to the rear of the frame 31 and place the electronic device 2 on the empty corner 25 of the stopper 37, the electronic device 2 can pass the stopper 37 and reach the frame 31 from top, the stopper 37 is moved further to have the protruding bar 376 wedged onto the opening 351, at the same time the standing stopper 373 of the stopper 37 and the sliding slot 33 lock both sides of the electronic device 2, the electronic device 2 is locked firmly onto the frame 31 by the standing stopper 373 of the stopper 37 and the sliding slot 33 pressing on both sides.

When the electronic device 2 is to be taken out from the frame 31, users can pull the handle 375 to have the protruding bar 376 move away from the opening 351, then pull the stopper 37 backward to have the electronic device 2 moved away from the pressure of the standing stopper 373, the electronic device 2 then can be taken out from the frame 31.

Figure 7:
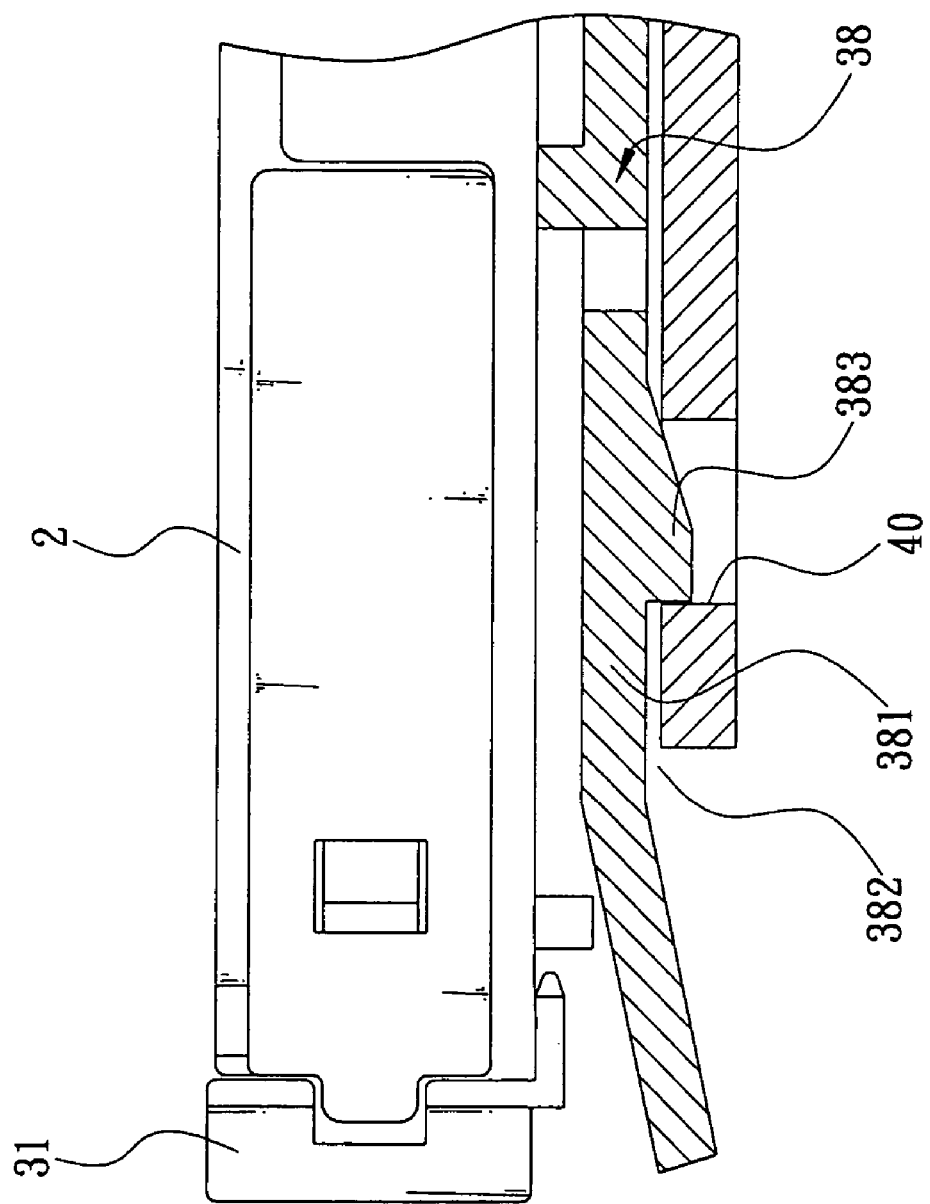
FIG. 7 is another cross-sectional view of the present invention.

Referring to FIG. 3, FIG. 4 and FIG. 5, a fastening part 38 is on the bottom of the frame 31, the end of the fastening part 38 connects to the bottom of the frame 31; a spring slice 381 is on the front of the fastening part 38, at least one protruding point 383 is on the center bottom of the spring slice 381, the end of the spring slice 381 leans downward and forms a wedging slot 382 (as shown in FIG. 7) on the bottom of the spring slice 381, when the frame 31 is inserted into the cavity of the computer, the protruding point 383 of the spring slice 381 wedges onto the front hole 40 on front of the cavity to stable the frame 31 inside the cavity, and connects the electronic device 2 on the frame 31 to the computer. When the electronic device 2 malfunctions, users can pull the end of the spring slice 381 to have the protruding point 383 of the spring slice 381 moved away from the front hole 40, then pull the frame 31 out and take the electronic device 2 out from the frame 31 for repair.

Referring to FIG. 3, FIG. 4 and FIG. 5, a fastening board 384 protruding up and in parallel to the fastening part 38 is on the location where the end of the fastening part 38 wedges on the bottom center of the frame 31, two gaps 387 are respectively formed between both sides of the fastening board 384 and the fastening part 38; a concave 311 with the same depth of the gap 387 and corresponding to the top of the fastening board 384 is on the frame 31, a concave hole 312 with the same angle, same physical area and shape as the fastening board 384 is on the center of the concave 311; two sets of positioning hole 313 are on both sides of the concave 311 of the frame 31, a frame body 385 corresponding to the positioning hole 313 is on the rear of the fastening part 38, a pair of protruding poles 386 corresponding to the positioning holes 313 are on the frame body 385; when the rear of the fastening part 38 connects to the bottom of the frame 31, users can have the fastening board 384 passed through the concave hole 312 at the same angle of the concave hole 312, then turn the fastening part 38 to have the gaps 387 of the fastening board 384 wedged into the concave 311, at the same time to have the protruding pole 386 inserted into the positioning hole 313, the rear of the fastening part 38 is fixed firmly onto the bottom of the frame 31.

Referring to FIG. 3, two (at least one) positioning poles 333 are shown on the inner wall of the sliding slot 33 of the frame 31, same amount of positioning holes 23 corresponding to the positions of the positioning poles 333 are on the electronic device 2; when users install the electronic device 2 onto the frame 31, the stopper 37 is pulled backward to the rear of the frame 31, then to have the positioning holes 23 of the electronic device 2 wedged into the positioning poles 333 and have the electronic device 2 fixed firmly inside the frame 31, and then place the electronic device 2 on the empty corner 25 of the stopper 37, the electronic device 2 can pass the stopper 37 and reach the frame 31; finally the stopper 37 is moved further to have the protruding bar 376 wedged onto the opening 351; at the same time the standing stopper 373 of the stopper 37 and the sliding slot 33 lock both sides of the electronic device 2, the electronic device 2 is locked firmly onto the frame 31 by the standing stopper 373 of the stopper 37, the sliding slot 33 pressing on both sides and the positioning pole 333.

Referring to FIG. 2 and FIG. 3, the physical size of the front panel 21 of the electronic device 2 is slightly larger than the width of the frame 31, when the electronic device 2 is inserted into the frame 31, the front panel 21 of the electronic device 2 can lean against the front of the frame 31.

While a preferred embodiment of the invention has been shown and described in detail, it will be readily understood and appreciated that numerous omissions, changes and additions may be made without departing from the spirit and scope of the invention.

What is claimed is:

1. A fixing mechanism of an electronic device comprising:

a frame with an inverted "L" shape sliding slot on one side, a wall is on the edge of the other side, a sliding track is on said wall, a pair of open slots are on said sliding track, a rib is between said open slots;

a stopper moving freely located on said open slots, a pair of hooks are on the bottom of said stopper to hook on said corresponding open slots and make said stopper moved back and forward on said open slots, an inverted "L" shape standing stopper is on one side of said wall facing said stopper, a handle is on the back of said standing stopper, a protruding bar is on said handle, an opening corresponding to said protruding bar is on said wall, when said stopper moves forward, said protruding bar wedges into said opening and fixes said stopper from moving, an electronic device is installed on said frame by pulling said stopper backward to the rear of said frame, to pass said stopper and reach said frame from top, the electronic device is locked firmly onto said frame by said standing stopper of said stopper and said sliding slots pressing on both sides.

2. The fixing mechanism of an electronic device of claim 1, wherein a fastening part located on the bottom of said frame, the end of said fastening part connects to the bottom of said frame, a spring slice is on the front of said fastening part, at least one protruding point is on the center bottom of said spring slice, the end of said spring slice leans downward and forms a wedging slot on the bottom, while installing, said frame is inserted into a cavity of a computer, said protruding point of said spring slice wedges onto the front hole on front of the cavity to stable said frame inside the cavity.

3. The fixing mechanism of an electronic device of claim 1, wherein at least one positioning pole located on the inner wall of said sliding slot of said frame, same amount of positioning hole corresponding to the position of said positioning poles are on the electronic device, while installing, said positioning hole of said frame wedges into said positioning pole of the electronic device to fix the electronic device onto said frame.

* * * * *